US012561290B2

(12) United States Patent
Mathew et al.

(10) Patent No.: US 12,561,290 B2
(45) Date of Patent: Feb. 24, 2026

(54) RETURNING A PRIORITIZED LIST OF SERVICES TO CLIENTS TO ENABLE FEATURE-SPECIFIC REDIRECTION

(71) Applicant: Dell Products L.P., Round Rock, TX (US)

(72) Inventors: George Mathew, Belmont, CA (US); Donna Barry Lewis, Holly Springs, NC (US); Vikas Chaudhary, Pune (IN); Poornima Gupte, Pune (IN); Ajey Godbole, Pune (IN)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 18/648,121

(22) Filed: Apr. 26, 2024

(65) Prior Publication Data

US 2025/0335399 A1     Oct. 30, 2025

(51) Int. Cl.
| | |
|---|---|
| *G06F 17/00* | (2019.01) |
| *G06F 7/00* | (2006.01) |
| *G06F 16/174* | (2019.01) |
| *G06F 16/185* | (2019.01) |

(52) U.S. Cl.
CPC ........ G06F 16/1748 (2019.01); G06F 16/185 (2019.01)

(58) Field of Classification Search
CPC ........................... G06F 16/1748; G06F 16/185

USPC ......................................................... 707/692
See application file for complete search history.

(56) References Cited

U.S. PATENT DOCUMENTS

| | | | | |
|---|---|---|---|---|
| 9,460,102 | B1 * | 10/2016 | Bono ................... | G06F 16/1748 |
| 11,593,332 | B1 * | 2/2023 | Shilane ............... | G06F 16/2255 |
| 2003/0225801 | A1 * | 12/2003 | Devarakonda ........ | G06F 16/221 |
| 2009/0182789 | A1 * | 7/2009 | Sandorfi ............. | G06F 11/1004 |
| 2013/0290248 | A1 * | 10/2013 | Fukatani ............... | G06F 16/184 |
| | | | | 707/610 |
| 2016/0330132 | A1 * | 11/2016 | Rickey ................... | G06Q 10/06 |
| 2019/0205468 | A1 * | 7/2019 | Barnes, Jr. ........... | G06F 16/635 |
| 2024/0103978 | A1 * | 3/2024 | Madan ................ | G06F 16/1748 |

* cited by examiner

*Primary Examiner* — Pavan Mamillapalli
(74) *Attorney, Agent, or Firm* — Staniford Tomita LLP

(57)     ABSTRACT

A client-side library receives a request from an application on a client for an operation offered by a data protection system having a deduplication filesystem. A request is issued to the filesystem for a list of services that are available to handle the request from the application. The client-side library receives the list of services, including an indication of a preferred service for the operation as determined by the filesystem. A check is made as to whether the preferred service satisfies a set of conditions. If the preferred service satisfies each condition, the application is redirected to the preferred service. If the preferred service does not satisfy each condition, other services in the list are iterated over to find a service that does satisfy each condition.

18 Claims, 11 Drawing Sheets

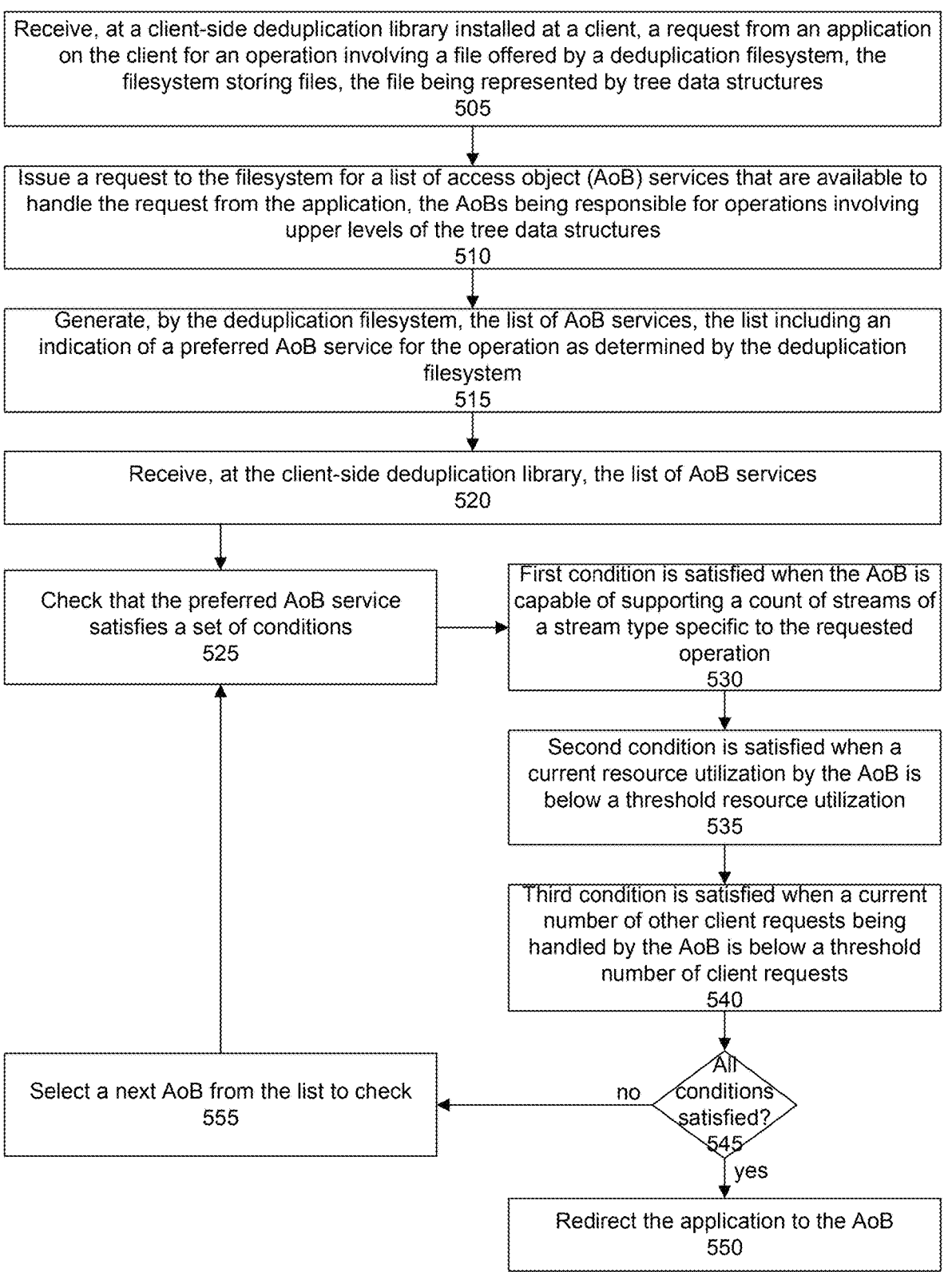

Receive, at a client-side deduplication library installed at a client, a request from an application on the client for an operation involving a file offered by a deduplication filesystem, the filesystem storing files, the file being represented by tree data structures
505

Issue a request to the filesystem for a list of access object (AoB) services that are available to handle the request from the application, the AoBs being responsible for operations involving upper levels of the tree data structures
510

Generate, by the deduplication filesystem, the list of AoB services, the list including an indication of a preferred AoB service for the operation as determined by the deduplication filesystem
515

Receive, at the client-side deduplication library, the list of AoB services
520

Check that the preferred AoB service satisfies a set of conditions
525

First condition is satisfied when the AoB is capable of supporting a count of streams of a stream type specific to the requested operation
530

Second condition is satisfied when a current resource utilization by the AoB is below a threshold resource utilization
535

Third condition is satisfied when a current number of other client requests being handled by the AoB is below a threshold number of client requests
540

Select a next AoB from the list to check
555

All conditions satisfied?
545 no yes

Redirect the application to the AoB
550

FIG. 5

RETURNING A PRIORITIZED LIST OF SERVICES TO CLIENTS TO ENABLE FEATURE-SPECIFIC REDIRECTION

TECHNICAL FIELD

The present invention relates generally to information processing systems, and more particularly to large scale filesystems.

BACKGROUND

A distributed filesystem is a type of filesystem that spans multiple servers, but provides a unified view to clients accessing the filesystem. A deduplicated filesystem is a type of filesystem that seeks to reduce the amount of redundant data that is stored by storing only a single copy of data rather than multiple redundant copies. A deduplicated filesystem can be especially effective in a backup system because of the reduction in the number of duplicate copies of data that are stored. A cluster refers to a group of interconnected servers that work together to run an application as a single system. Clustering can improve performance, enhance availability, and provide scalability. Typical approaches to distributing incoming network traffic across multiple servers of a cluster do not recognize the unique characteristics and challenges posed when the application running in the cluster is a distributed deduplicated filesystem.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

A client-side library receives a request from an application on a client for an operation offered by a data protection system having a deduplication filesystem. A request is issued to the filesystem for a list of services that are available to handle the request from the application. The client-side library receives the list of services, including an indication of a preferred service for the operation as determined by the filesystem. A check is made as to whether the preferred service satisfies a set of conditions. If the preferred service satisfies each condition, the application is redirected to the preferred service. If the preferred service does not satisfy each condition, other services in the list are iterated over to find a service that does satisfy each condition.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 5 shows a flow for returning a prioritized list of services to a client for redirection, according to one or more embodiments.

DETAILED DESCRIPTION

Figure 1:
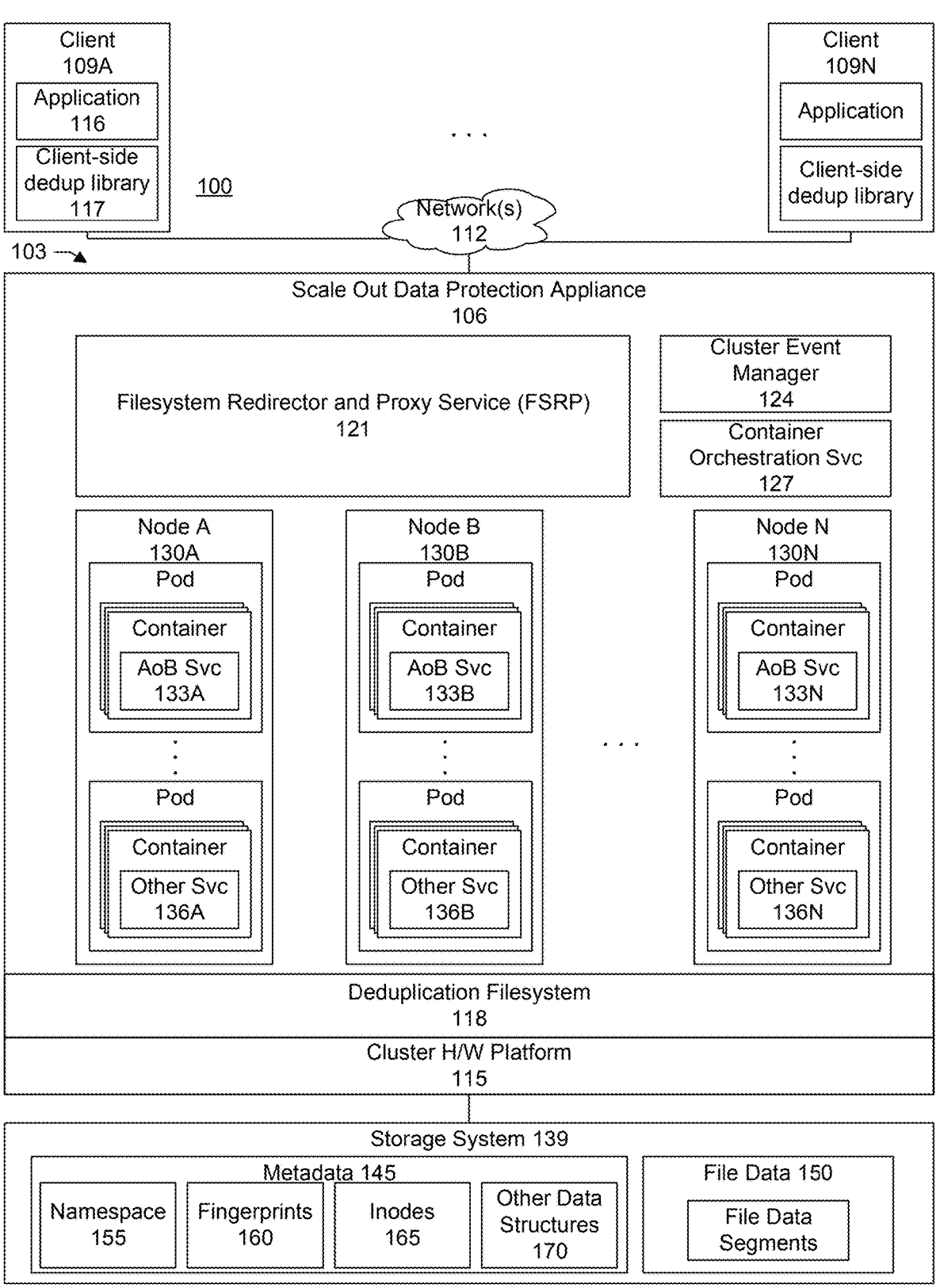
FIG. 1 shows a block diagram of an information processing system that returns a prioritized list of services to a client for redirection, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

FIG. 1 shows a block diagram of a system 100 within which methods and systems for returning a prioritized list of services to clients to enable feature-specific redirection may be implemented. An information processing system 103 includes a scale-out data protection appliance 106. A set of clients 109A-N are connected via a network 112 to the data protection appliance. The data protection appliance is responsible for managing and storing data (e.g., files) backed up from the clients. The system includes a set of distributed components and services supported by an underlying cluster hardware platform 115. The hardware platform may include memory and processors, among other hardware components. The clients, such as client 109A, may include an application 116 and a client-side deduplication library or plugin 117 installed at the clients.

The application may include, for example, a backup application. The backup application can provide centralized management and orchestration for backups and recoveries of various clients connected to the data protection appliance, a graphical user interface (GUI) through which a user or administrative user can discover assets to protect (e.g., databases, virtual machines, filesystems, workloads, and the like), schedule and configure backups, author data protection and retention polies, and so forth.

The client-side deduplication library is positioned between the client application and data protection appliance. The library may be provided as a plugin that can integrate with the client application. In an embodiment, the library exposes an application programing interface (API) to the client application through which services of the data protection appliance may be made available. Such services may help to facilitate and accelerate backup and recovery operations. For example, the library may coordinate with the data protection appliance to deduplicate data locally at the client. This can reduce the amount of data that is transferred over the network and also CPU and network resources required by the data protection appliance.

In an embodiment, the data protection appliance includes a deduplication filesystem 118, filesystem redirector and proxy service (FSRP) 121, cluster event manager (CEM) 124, container orchestration service 127, and nodes 130A-N hosting services of the filesystem. Such services may include access object (AoB) services 133A-N among other services 136A-N. The nodes may be physical or virtual nodes. A cluster may have a combination of physical and virtual nodes. The filesystem is connected to a storage system 139 that provides persistent storage for the services, files managed by the filesystem, and metadata structures organizing the files.

The client-side deduplication library communicates with the filesystem to handle operations requested by the client application. In an embodiment, FSRP receives a request from the client (e.g., client-side deduplication library) to perform an operation on a file. FSRP generates a list of access object services that are available to handle the requested operation. The list includes an indication of a preferred access object service, as determined by FSRP. The client library checks whether the access object service identified as preferred by FSRP satisfies a set of conditions. The conditions can be specific to the requested operation. If the client library determines that the access object service satisfies each of the conditions, the client library redirects the client application to that access object service by providing the client application with an Internet Protocol (IP) address of the access object service. The client application can then use the IP address to make a direct connection to the access object service. If the client library determines that the access object service does not satisfy each of the conditions, the client library iterates checking over other access object services in the list to find an access object service that does satisfy the conditions.

More particularly, the filesystem redirection proxy service returns a prioritized list of access object (AoB) services to the clients. The clients consume this prioritized list of AoB services to identify an AoB service where the file/directory operations are to be redirected based on the feature being exercised.

FSRP generates the prioritized list of AoBs and includes in the list an indication of an AoB service that is preferred for the operation. For example, FSRP may indicate the preference by ordering the listing of AoBs such that a first or initial AoB service in the list is the preferred AoB service. In an embodiment, the preferred AoB service is that AoB service selected by the FSRP consistent hashing algorithm. A discussion of the FSRP consistent hashing algorithm is provided in U.S. patent application Ser. No. 18/648,104, filed Apr. 26, 2024, which is incorporated by reference along with all other references cited. Once the first or preferred AoB is identified and added in the list, FSRP iterates through its in-memory AoB list in a round-robin method to populate the rest of the AoBs in the prioritized list.

The client receives the prioritized AoB list as part of an FSRP remote procedure call (RPC) response and identifies an AoB service for file/directory operation redirection. To select the AoB, the client, based on the feature being exercised, uses multiple criteria including checking availability of sufficient AoB streams, CPU/memory/network/disk utilization of the AoB service, and total number of client requests currently served by the AoB service.

Thus, in an embodiment, a final decision on which AoB service to select for an operation on a file is delegated to the client or, more specifically, the client-side deduplication library or plugin. In some cases, there can be a delay between when the client application makes a request for the operation on the file and when the client application actually follows up on the operation. The client-side deduplication library can have better insight into the client application than FSRP because the library is installed locally at the client along with the application. An access object service initially identified as being not overloaded at the time of the request may become overloaded by the time the client application actually follows up on the operation. Placing the final decision on selecting an access object service with the client-side deduplication library helps to reduce the likelihood that an access object service selected for the operation becomes stale by the time the client application actually follows up on the operation.

In an embodiment, the filesystem includes a set of microservices distributed across multiple nodes of a cluster. The services or microservices include the FSRP service and access object services hosted across the nodes of the cluster. The services are managed by the container orchestration service. An example of a container orchestration service is Kubernetes. Kubernetes is an open-source container-orchestration system for automating computer application deployment, scaling, and management. The data protection appliance may be referred to as a scale-out data protection appliance as filesystem services can be quickly scaled up or down based on demand.

A container is a virtualized computing environment that runs an application program as a service or, more specifically, microservice. Containers are similar to virtual machines (VMs). Unlike VMs, however, containers have relaxed isolation properties to share the operating system (OS) among the containerized application programs. Containers are thus considered lightweight. Containers can be portable across hardware platforms including clouds because they are decoupled from the underlying infrastructure. Applications may be run by containers as microservices with the container orchestration service facilitating scaling and failover. For example, the container orchestration service can restart containers that fail, replace containers, kill containers that fail to respond to health checks, and withhold advertising them to clients until they are ready to serve.

In an embodiment, the filesystem services or microservices run inside the virtualized environment provided by the orchestration service as containers. One or more containers may be grouped into a group that may be referred to as a pod. Pods can run one or more containers that share the same network namespace, storage, and other resources. The filesystem services can run on one or multiple physical or virtual nodes. The filesystem can be run on premises with dedicated hardware or in a public cloud environment.

The cluster event manager communicates with the container orchestration service to monitor the cluster including cluster membership and, more particularly, identifications of AoB instances that are currently active or available in the cluster. The FSRP service may subscribe to cluster event notifications generated by the cluster event manager. Such notifications apprise the FSRP service of membership changes to the cluster such as an instance of an AoB service being added to the cluster or an instance of an AoB service being removed from the cluster. The FSRP tracks the AoB services that are currently available or active in the cluster so that client requests can be properly redirected to an AoB service that is available or active.

The filesystem receives data protection workload or other filesystem requests from the clients, processes the requests, and returns results of the processing back to the clients. The storage system stores data written to and generated by the filesystem including metadata 145 and client or user file data 150. Metadata includes a namespace 155, fingerprints 160, and inodes 165, among other data structures 170.

The filesystem provides a way to organize data stored in a storage system and present that data to clients and applications in a logical format. The filesystem organizes the data into files and folders into which the files may be stored. When a client requests access to a file, the filesystem issues a file handle or other identifier for the file to the client. The client can use the file handle or other identifier in subsequent operations involving the file. The namespace of the filesystem provides a hierarchical organizational structure for identifying filesystem objects through a file path. A file can be identified by its path through a structure of folders and subfolders in the filesystem. A filesystem may hold many hundreds of thousands or even many millions of files across many different folders and subfolders and spanning thousands of terabytes.

In an embodiment, any AoB can handle namespace operations and file access, but different AoBs may be assigned responsibility for different ranges of files. Based on a hash of a file handle, path, or other information associated with a file, the filesystem redirector and proxy services attempts to redirect or route associated data protection traffic to a particular access object service in a consistent manner so that future writes and/or reads of the same file are routed consistently to the same access object service. Consistent routing or redirection by FSRP enables the AoBs to cache state in memory that may be reused for other accesses. Consistent routing further helps to reduce locking, coordination, and collision issues among different AoBs because each AoB can operate on its assigned range of files independent of another AoB that may be assigned a different range of files. An AoB attempts to keep necessary state in memory for efficiency. The state, however, is globally available and can be handled by other AoB instances in case of an instance failure. The files or, more particularly, file handle hash ranges can be dynamically reassigned to the AoBs to maintain a balance across currently available AoBs.

Figure 2:
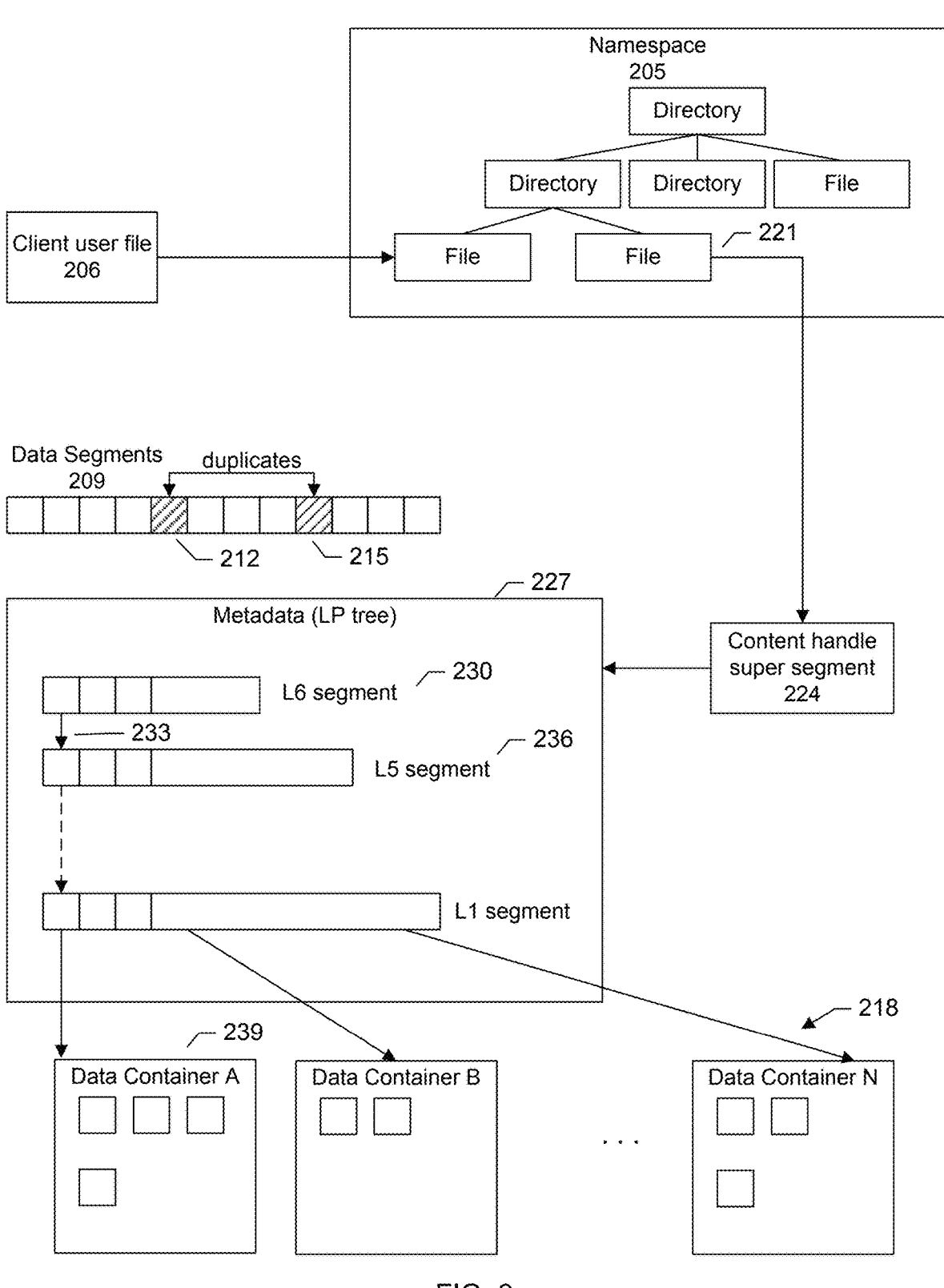
FIG. 2 shows an example of a deduplication process, according to one or more embodiments.

In an embodiment, the filesystem is a deduplicated filesystem. FIG. 2 shows a block diagram illustrating a deduplication process of the filesystem according to one or more embodiments. A deduplicated filesystem is a type of filesystem that can reduce the amount of redundant data that is stored. As shown in the example of FIG. 2, the filesystem maintains a namespace 205. Further details of a filesystem namespace are provided in FIG. 3 and the discussion accompanying FIG. 3.

As data, such as incoming client user file 206, enters the filesystem, it is segmented into data segments 209 and filtered against existing segments to remove duplicates (e.g., duplicate segments 212, 215). A segment that happens to be the same as another segment that is already stored in the filesystem may not be again stored. This helps to eliminate redundant data and conserve storage space. Metadata, however, is generated and stored that allows the filesystem to reconstruct or reassemble the file using the already or previously stored segment. Metadata is different from user data. Metadata may be used to track in the filesystem the location of the user data within a shared storage pool. The amount of metadata may range from about 2 or 4 percent the size of the user data.

More specifically, the filesystem maintains among other metadata structures a fingerprint index. The fingerprint index includes a listing of fingerprints corresponding to data segments already stored to the storage pool. A cryptographic hash function (e.g., Secure Hash Algorithm 1 (SHA1)) is applied to segments of the incoming file to calculate the fingerprints (e.g., SHA1 hash values) for each of the data segments making up the incoming file. The fingerprints are compared to the existing fingerprints in the fingerprint index. Matching fingerprints indicate that corresponding data segments are already stored. Non-matching fingerprints indicate that the corresponding data segments are unique and should be stored.

Unique data segments are packed and stored in fixed size immutable containers 218. There can be many millions of containers tracked by the filesystem. The fingerprint index is updated with the fingerprints corresponding to the newly stored data segments. A content handle 221 of the file is kept in the filesystem's namespace to support the directory hierarchy. The content handle points to a super segment 224 which holds a reference to a top of a segment tree 227 of the file. The super segment points to a top reference 230 that points 233 to metadata 236 and data segments 239.

Thus, in a specific embodiment, each file in the filesystem may be represented by a tree. The tree includes a set of segment levels arranged into a hierarchy (e.g., parent-child). Each upper level of the tree includes one or more pointers or references to a lower level of the tree. A last upper level of the tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., a child level) that the upper level segment references.

A tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes. In an embodiment, segments in the filesystem are identified by 24 byte keys (or the fingerprint of a segment), including the LP segments. Each LP segment contains references to lower level LP segments.

Figure 3:
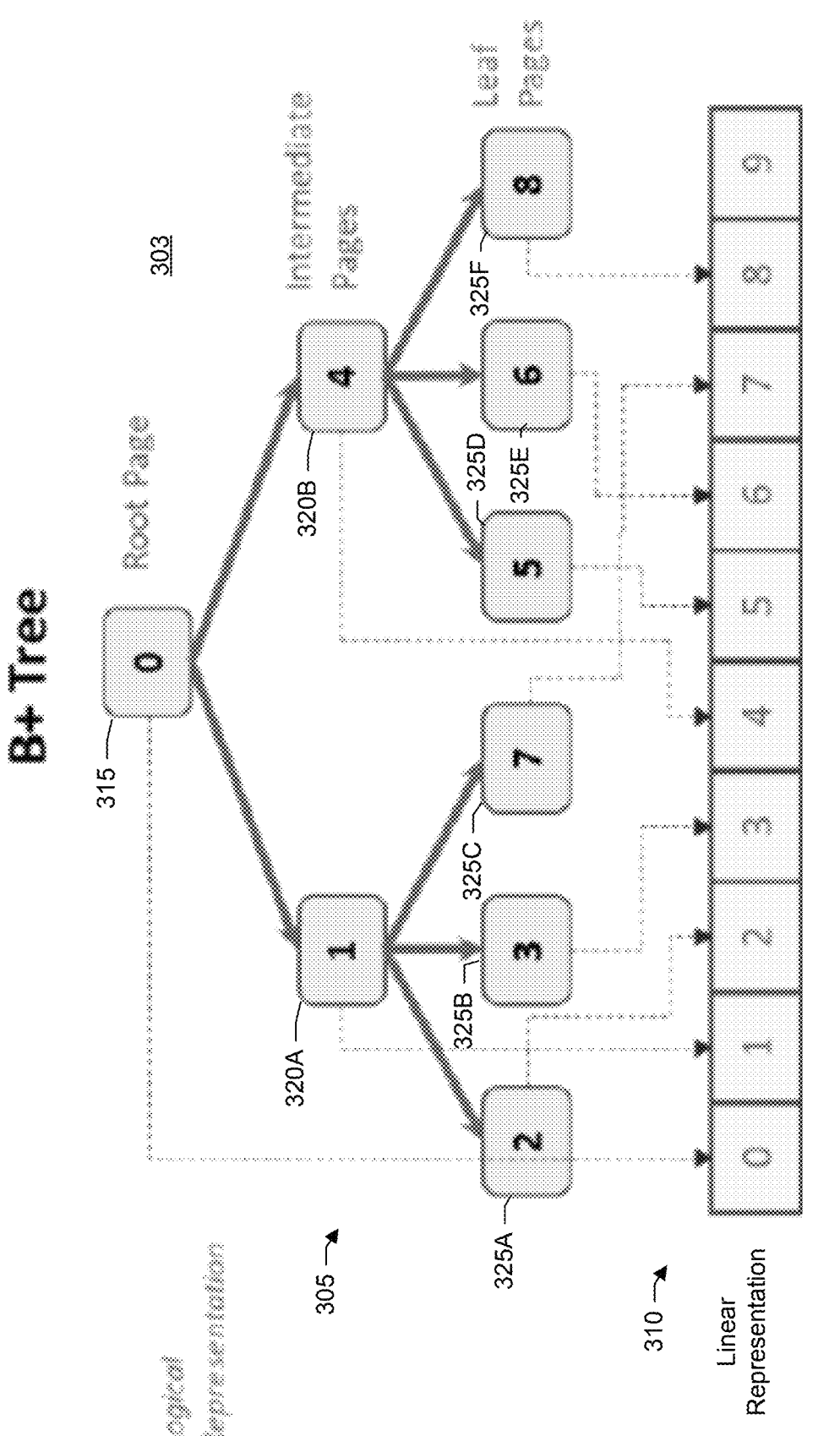
FIG. 3 shows an example of a tree data structure of the namespace, according to one or more embodiments.

FIG. 3 shows further detail of a namespace of the filesystem. In an embodiment, the namespace is represented by a B+ tree data structure where pages of the tree are written to a key-value store. Page identifiers form the keys of the key-value store and page content form the values of the key-value store. The tree data structure includes the folder and file structure as well as file inodes. FIG. 3 shows an example of a B+ Tree 303 in a logical representation 305 and a linear representation 310. In this example, there is a root page 315, intermediate pages 320A,B, and leaf pages 325A-F. The broken lines shown in FIG. 3 map the pages from their logical representation in the tree to their representation as a linear sequential set of pages on disk, e.g., flattened on-disk layout. In other words, the tree may be represented as a line of pages of data.

The intermediate pages store lookup keys that reference other intermediate or leaf pages. An intermediate page may be referred to as an INT page and references other INT pages or leaf pages by interior keys.

The leaf page contains "key/value" pairs. In an embodiment, a B+ Tree key is a 128-bit number kept in sorted order on the page. It is accompanied by a "value," which is an index to data associated with that key and may be referred to as a "payload." In an embodiment, the 128-bit key includes a 64-bit PID, or parent file ID (the ID of the directory that owns this item), and a 64-bit CID, or child file ID. In an embodiment, the leaf page stores a key for each file in the filesystem. The key references a payload identifying an inode number of the file and thus a pointer to content or data of the file. There can be another key for each file that identifies a name of the file.

Figure 4:
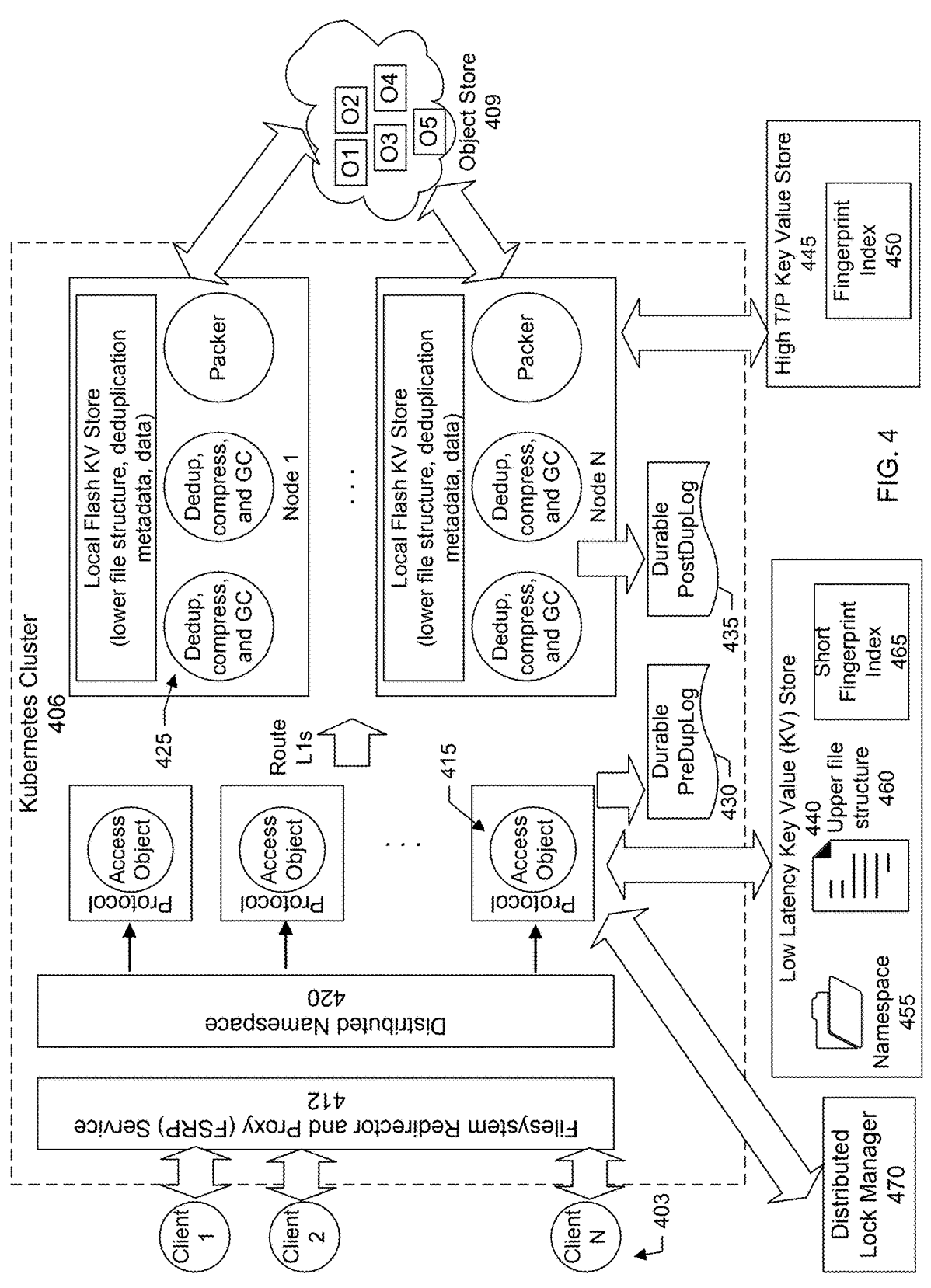
FIG. 4 shows an architecture of the deduplication filesystem, according to one or more embodiments.

FIG. 4 shows an example of an architecture having the FSRP service, according to one or more embodiments. The example shown in FIG. 4 includes a set of clients 403, a cluster 406 at which a deduplicated filesystem is hosted across nodes of the cluster, and an object store 409 storing file data segments that have been packed into objects. As discussed, in an embodiment, the cluster is a Kubernetes cluster where the filesystem is provided as a set of micro-services. The cluster includes FSRP 412 and a set of nodes hosting a set of AoBs 415 across which a namespace 420 is distributed. AoBs may handle namespace operations, file access requests, file creation, folder creation, file reads, and file writes. AoBs are responsible for operations involving upper levels of the tree data structures representing the files.

There is another set of nodes hosting other services 425 that handle lower levels of the tree or file structures, such as the L1-L0 segments. Such services may include services for deduplication, compression, garbage collection, and packing of file segments into objects for storage in the object store. The AoBs route the lower level segments including L1s to these other backend services for further processing, e.g., deduplication, compression, and packing.

Operations and activities of the services may be recorded in a log. There can be a durable pre-deduplication log 430 used by the AoBs and a durable post-deduplication log 435 used by the backend services. The logs can be used to allow operations to resume following an interruption of a particular service instance.

A key value store may be used to store metadata of the filesystem. There can be a low latency key value store 440 used by the AoBs and a high throughput key value store 445 used by the backend deduplication, compression, garbage collection, and packing services. The high throughput key value store stores a fingerprint index 450. The low latency key value store stores a namespace 455, upper file structure (e.g., upper segment tree levels) 460, and a short fingerprint index 465.

There can be a distributed lock manager 470 to coordinate file and folder updates by the AoBs to the Btree structure holding the namespace. When an AoB needs to make an update, the AoB acquires from the distributed lock manager a lock on one or more pages of the tree structure and makes the updates.

The filesystem supports multiple network protocols for accessing the data stored and managed by the filesystem. Such protocols include Data Domain Boost ("Boost" or "DDBoost"), Network Filesystem (NFS), and Amazon Simple Storage Service (S3), among others. DDBoost is a system that distributes parts of a deduplication process to the application clients, enabling client-side deduplication for faster, more efficient backup and recovery.

In an embodiment, the clients use the DDBoost backup protocol to conduct backups of client data to the storage system, restore the backups from the storage system to the clients, or perform other data protection operations. A DDBoost client library exposes application programming interfaces (APIs) to integrate with the storage system. These API interfaces exported by the DDBoost library provide mechanisms to access or manipulate the functionality of the Data Domain filesystem, as provided by Dell Technologies. Embodiments may utilize the DDBoost Filesystem Plug-In (BoostFS), which resides on the client application system and presents a standard filesystem mount point to the application. With direct access to a BoostFS mount point, the application can leverage the storage and network efficiencies of the DDBoost protocol for backup and recovery. Some embodiments are described in conjunction with the DDBoost protocol, PowerProtect Data Manager (PPDM), PowerProtect Backup Appliance, and Data Domain filesystem as provided by Dell Technologies. It should be appreciated, however, that principles and aspects discussed can be applied to other filesystems, filesystem protocols, and backup storage systems.

In an embodiment, the data protection system is built on a Kubernetes PaaS (Platform as a Service). The filesystem redirection proxy (FSRP) is a service which is the entry point for a data-path. At the start of backup/restore operations, the clients (e.g., Boost clients) talk with the FSRP service to obtain an Internet protocol (IP) address identifying an access object service to handle the requested operation. In an embodiment, FSRP returns a list of IP addresses identifying multiple access object services to the requesting client. The client makes a selection of a particular access object service and can then connect directly to that particular access object service to complete the processing of their requested operation. More specifically, in an embodiment, a DDBoost client selects a particular AoB for a file/directory operation based on a feature being exercised. Some examples of features that may be offered by the data protection system include instant access/instant restore, data protection backup operation or data protection restore operation. Instant access/instant restore refer to techniques that allow a backup image of a virtual machine to be booted from the data protection system. The DDBoost client relies on the FSRP service for sending the prioritized AoB list and identifies an AoB service out of this prioritized list for file/directory operation redirection. A further discussion of FSRP is provided in U.S. patent application Ser. No. 18/428, 717, filed Jan. 31, 2024, which is incorporated by reference along with all other references cited.

FIG. 5 shows an overall flow for returning a prioritized list of access object services to clients to enable feature-specific redirection, according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 505, a client-side deduplication library or plugin installed at a client receives a request from an application on a client for an operation involving a file, the operation being offered by a data protection system. In an embodiment, the data protection system includes a deduplication filesystem storing files. The files are represented by tree data structures.

In a step 510, the client-side library, in turn, issues a request to the filesystem for a list of access object services that are available to handle the request from the client application, the access object services being responsible for operations involving upper levels of the tree data structures. The request is received by a filesystem redirector proxy service of the deduplication filesystem.

In a step 515, the deduplication filesystem or, more particularly, the filesystem redirector proxy service, generates a listing identifying each of the multiple access object services in the cluster that are available, online, or active to handle the requested operation by the client application. FSRP includes with the listing an indication of a preferred access object service, as determined by FSRP, that should handle the request. The filesystem redirector proxy service then sends the listing to the client (e.g., client-side deduplication library).

As discussed, FSRP as a subscriber to the cluster event manager, maintains or is aware of the different instances of the access object services that are currently available, online, or active in the cluster. FSRP further maintains a mapping of file hash ranges to responsible access object services. That is, each access object service is responsible for a respective hash range. In an embodiment, FSRP identifies the preferred access object service by hashing a file path, handle, or other identifier associated with the file to obtain a hash value. The hash value is cross-referenced against the mapping to identify a particular AoB service having responsibility for the hash range within which the hash value falls. The particular AoB service is identified as the preferred access object service. FSRP then applies a round-robin algorithm to the populate the list with the other access object services remaining in the cluster.

For example, FSRP may receive event notification messages from the cluster event manager that includes an ordered listing of access object services currently present in the cluster. FSRP, after identifying an access object service as preferred, may then populate the list by picking the remaining access object services using a round robin algorithm. Each time there is a need to generate a prioritized listing of access object services, FSRP uses the latest event notification message received from the cluster event manager. This helps to ensure that FSRP provides up-to-date information regarding cluster membership.

As another an example, consider that the cluster includes first, second, and third access object services. FSRP receives a first client request for an operation on a first file. A hash of a file handle identifying the first file indicates that the first access object service has responsibility. FSRP identifies the first access object service as the preferred access object service. FSRP generates a first prioritized list of AoB services that lists the first access object service as the first item in the list, thereby indicating that the first access object service is the preferred access object service. The remaining access object services are selected using the round-robin algorithm. For example, the second access object service may be listed in the list, followed by the third access object service. FSRP receives a second client request for an operation on a second file. A hash of a file handle identifying the second file indicates that the first access object service again has responsibility. FSRP identifies the first access object service as the preferred access object service. FSRP generates a second prioritized list of AoB services that lists the first access object service as the first item in the list, thereby indicating that the first access object service is the preferred access object service. The remaining access object services are selected using the round-robin algorithm. For example, the third access object service may be listed in the list, followed by the second access object service.

It should be appreciated that round-robin is merely an example of an algorithm that may be used to populate the prioritized AoB list with the remaining AoB services in the cluster after a preferred access object service has been identified. In other embodiments, other selection algorithms may instead or additionally be used. For example, in another embodiment, once a preferred access object service has been identified, a random selection algorithm may be used to populate the list with the other access object services that remain in the cluster.

In a step 520, the list of AoB services is received at the client or, more particularly, received by the client-side deduplication library.

In a step 525, the client, e.g., client-side deduplication library, checks that the preferred access object service satisfies a set of conditions. More specifically, in a step 530, a

12 more embodiments. The entities shown in FIG. 6 include a client 610 (e.g., DDBoost client), FSRP 615, cluster event manager (CEM) 620, and any number of AoB services 625A-N. In an embodiment, FSRP generates the prioritized list of AoBs where the first (or initial) AoB service in the list is the one selected by the FSRP consistent hashing algorithm. Once the first AoB is identified and added in the list, FSRP iterates through its in-memory AoB list in a round-robin method to populate the rest of the AoBs in the prioritized list. Table A below shows a flow preparing the prioritized list.

TABLE A

| Step | Description |
|---|---|
| 1 | FSRP maintains an in-memory AoB details list which is populated with AoB details received from the CEM service. FSRP updates this in-memory list as per the AoB service change event received from the CEM (e.g., service up or service down). |
| 2 | The order of the AoBs in this in-memory list depends on the sequence of AoB details received from CEM. |
| 3 | FSRP invokes a consistent hashing algorithm to determine best-fit/desired AoB based on the RPC input parameter "file handle." |
| 4 | This best-fit/desired AoB is identified by ordering or positioning it as the first AOB in the preferred list of the AoB services which the remote procedure call (RPC) will return. |
| 5 | To populate the rest of the AoBs in the RPC response list, FSRP conducts a look-up for this best-fit/desired AoB in its in-memory list. It then iterates the in-memory list in a round-robin method to select the rest of AoBs. |
| 6 | So, the sequence of the AoBs in the response list depends on a position of a preferred AoB in the in-memory list and the AoB details FSRP received from the CEM. |
| 7 | This generated prioritized list of the AoB services is returned as a response of the FSRP RPC. | first condition is satisfied when the access object service is capable of supporting a count or number of streams of a stream type specific to the requested operation. In a step 535, a second condition is satisfied when a current resource utilization by the access object service is below a threshold resource utilization. In a step 540, a third condition is satisfied when a current count or number of other client requests being handled by the access object service is below a threshold count or number of client requests.

In a step 545, a determination is made as to whether each condition is satisfied. In a step 550, if each condition is satisfied, the client application is redirected to the access object service. That is, the client-side deduplication library returns an IP address of the access object service to the client application. The client application then uses the IP address to make a direct connection to the access object service to continue processing the application request.

If, however, each condition is not satisfied, in a step 555, the client-side deduplication library iterates the checking over a next access object service from the list to find an access object service that does satisfy each of the conditions.

As discussed above, in an embodiment, an access object service must satisfy each condition in order to be selected for redirection. In another embodiment, only a single condition needs to be satisfied in order to be selected for redirection. For example, an access object service may satisfy a first condition, but not the second or third conditions, yet still be selected for redirection. An access object service may satisfy first and second conditions, but not the third condition, yet still be selected for redirection. In other embodiments, there can other conditions that a service must satisfy. These other conditions may replace one or more of the first, second, or third conditions or may be in addition to one or more of the first, second, or third conditions.

Figure 6:
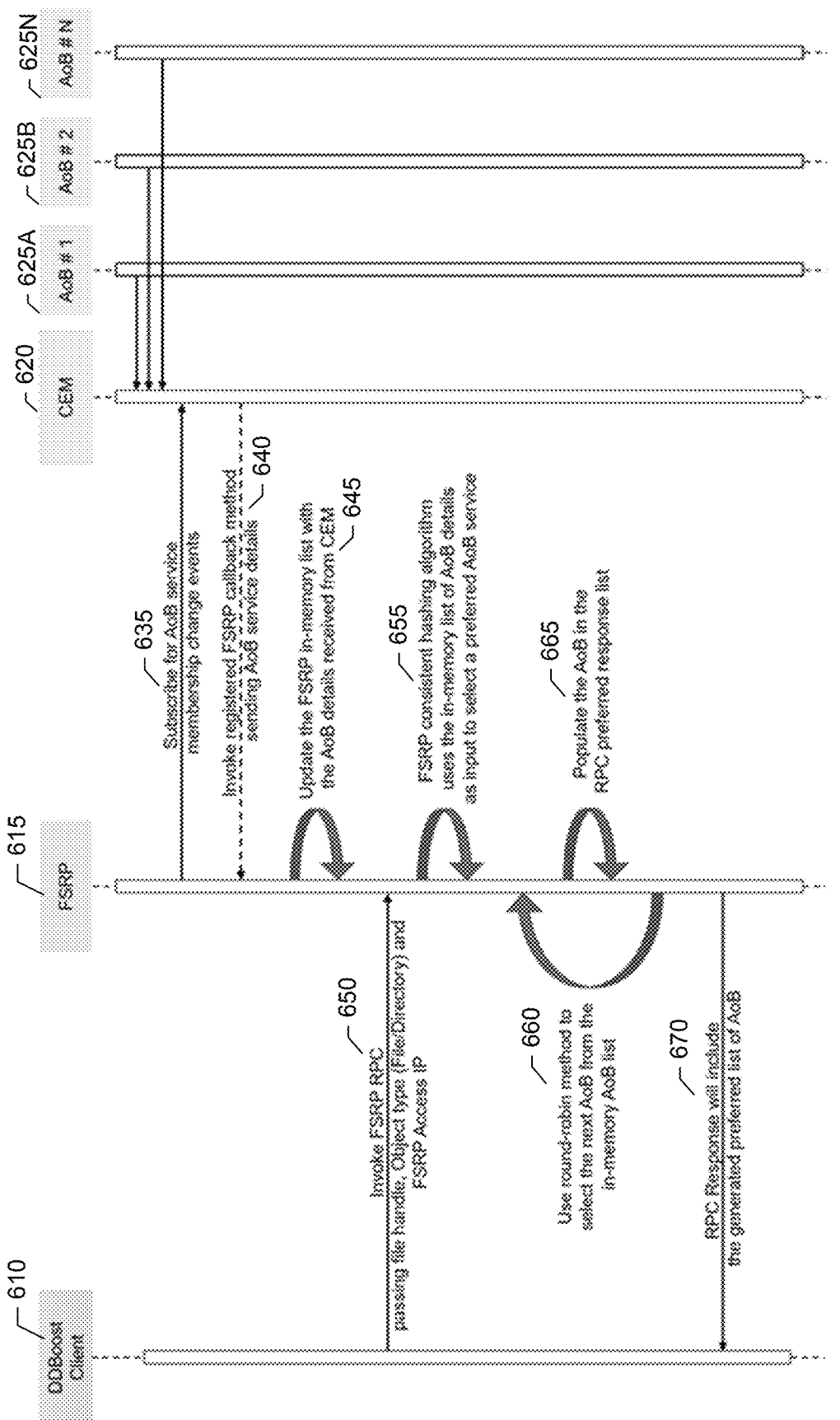
FIG. 6 shows a swimlane diagram for returning a prioritized list of services to a client for redirection, according to one or more embodiments.

FIG. 6 shows a swimlane diagram for FSRP's preparation of the prioritized list of AoB services, according to one or Referring now to FIG. 6, in steps 630A-N, when a new access object service joins the cluster, the new access object service registers with the cluster event manager. In a step 635, FSRP subscribes to the cluster event manager for membership change events associated with the access object services.

As discussed, the cluster event manager tracks changes in the cluster such as an instance of an access object service being added to the cluster or an instance of an access object service being removed from the cluster. FSRP, as a subscriber to the cluster event manager, thus receives notifications and updates about members in the cluster including change event notifications. In particular, in a step 640, the cluster event manager invokes a registered FSRP callback method to send access object service details tracked by the cluster event manager to FSRP. Such details may include, for example, IP addresses of the access object services that are currently present in the cluster. In a step 645, FSRP updates its in-memory list with the access object service details received from the cluster event manager.

In a step 650, the client-side deduplication library (e.g., DDBoost client) invokes an FSRP RPC and passes various parameters such as a file handle, object type (e.g., file/directory), and FSRP access IP.

In a step 655, FSRP selects an access object service as a preferred access object service. In an embodiment, the selection is accomplished by applying a consistent hashing algorithm. FSRP uses the in-memory list of access object service details and the file handle or other identifier as input to select a preferred access object service. The preferred access object service is then added to a list of access object services to be returned to the client-side deduplication library. The list generated by FSRP may be referred to as a prioritized list or RPC preferred response list.

In a step 660, FSRP selects another active access object service in the cluster and adds it to the list (step 665). Steps 660 and 665 continue until each access object service remaining in the cluster has been added to the list. In an embodiment, FSRP uses a round-robin technique to make the selections of the remaining access object services.

In a step 670, FSRP returns the list as a response to the RPC invoked by the client-side deduplication library. The client-side deduplication library receives the list from FSRP. As discussed, the list lists the access object services that are currently present in the cluster. Thus, the list may include multiple access object services, e.g., two or more. The list further includes an identification of a preferred access object service as determined by FSRP. The preferred access object service may, for example, be listed in a top or first position in the list. It should be appreciated, however, that FSRP may use any ordering convention or other marker or flag to indicate which access object service is preferred.

The client library, e.g., DDBoost client, upon receiving the prioritized list of access object services then makes a selection of an access object service for redirection. As discussed, in an embodiment, there are multiple criteria that the DDBoost client uses to select an AoB for redirection. Specifically, the DDBoost client receives the prioritized AoB list as part of the FSRP RPC response and identifies an AoB service for the file/directory operation redirection. In an embodiment, the DDBoost client uses the following criteria to select an AoB for redirection: 1) whether the AoB has sufficient stream counts available based on the feature being exercised; 2) whether the AoB has sufficient resources concerning CPU/memory/network/disk utilization; and 3) whether DDBoost client requests currently served by the AoB are below configured threshold values.

Figure 7:
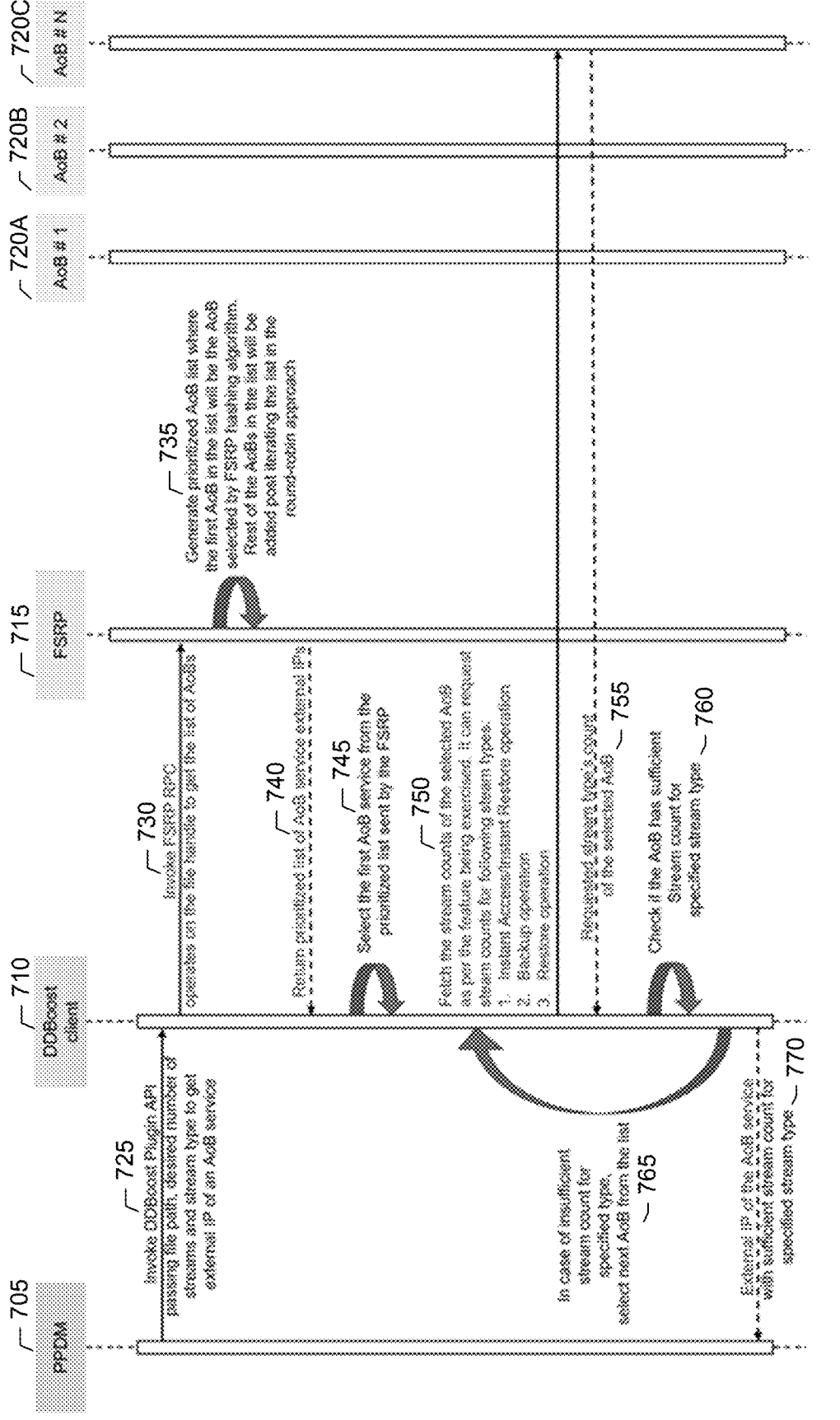
FIG. 7 shows a swimlane diagram for checking stream counts of a service, according to one or more embodiments.

FIG. 7 shows a swimlane diagram for checking whether an AoB service can support a sufficient number of stream counts based on the feature being exercised. In an embodiment, the DDBoost client invokes the FSRP RPC to obtain the prioritized list of AoBs where first AoB in the list is selected by the FSRP hashing algorithm. DDBoost then iterates through this prioritized list of AoBs until its able to find an AoB with sufficient steam count as per the feature being exercised. In an embodiment, the operations being exercised include: instant access/instant restore, backup operation, or restore operation. DDBoost fetches the stream counts of the respective stream type for each AoB and selects the AoB for redirection which has sufficient stream counts. For example, in the case of a request for an instant access/instant restore operation, the DDBoost client fetches the instant access/instant restore stream count. DDBoost returns the external IP address of the selected AoB service to the consumer of the DDBoost plugin API.

The entities shown in FIG. 7 include a client application 705, client-side deduplication library or plugin 710, filesystem redirector proxy service (FSRP) 715, and any number of access object services 720A-N. An example of a client application includes a backup application such as Power-Protect Data Manager (PPDM), as provided by Dell. In a step 725, the client application makes a request to exercise a feature or operation offered by the data protection appliance. In particular, the client application invokes the client library or plugin API and passes with a corresponding request a file path, desired number of streams, and stream type to obtain an external IP address of an access object service to handle the request.

In a step 730, the client library or plugin, in turn, makes a procedure call to FSRP. Specifically, the client invokes an FSRP RPC to operate on the file handle to obtain a list of the access object services. In a step 735, FSRP receives the RPC message and associated parameters, e.g., file handle or path, from the client and begins to generate a prioritized access object list. In an embodiment, a first or initial access object service in the prioritized list is the access object service selected by the FSRP hashing algorithm. This first or initial access object service may be referred to as a preferred access object service. The rest of the access object services in the list are added post iterating the list using a round-robin approach.

In a step 740, FSRP returns the prioritized list of access object services to the client library. Each access object service in the list is identified by an external IP address through which a respective access object service can be reached.

In a step 745, the client library selects the first access object service from the prioritized list sent by FSRP to check whether the access object service satisfies a set of conditions associated with the operation that has been requested by the client application (e.g., PPDM). As discussed, in an embodiment, the first access object service in the list is the preferred access object service as determined by FSRP based on a hash of the file handle, path, or other identifier.

Specifically, in a step 750, the client library communicates with the access object service to fetch stream counts as per the feature being exercised. In a step 755, a respective access object service responds with a corresponding number of streams of a particular type that it is processing. Streams refer to mechanisms for handling or processing data transfer. In an embodiment, the client library can request stream counts for the following stream types: 1) instant access/instant restore operation; 2) backup operation; or 3) restore operation. It should be appreciated that these are merely some examples of different stream types.

Different features or operations rely on different types of streams. While each type of stream may rely on similar resources, there can be differences in regards to details such as input source, output destination, buffers, file locking, flow controls, and so forth. Input source refers to the source from which data is read. Output destination refers to the destination that the data is to be written. Buffering provides temporary place to store data as it is read from an input source (e.g., read stream) or before it is written to the output destination (e.g., write stream). Buffering can help improve overall performance by reducing the number of system calls needed to read or write data from a source or destination; reduce latency associated with I/O operations especially when intermittent or variable latency sources such as network connects are involved; smooth variations in data flow rates between different processes; reduce resource contention; and facilitate asynchronous communication.

An access object service may be configured to handle or process certain thresholds in connection with different stream types. For example, an access object service may be configured to handle a threshold count of streams of a first type and a threshold count of streams of a second type, different from the first type. An access object service that has reached the threshold count of streams of the first type that it is currently handling, but not the threshold count of streams of the second type may not be able to open an additional number of streams of the first type, but may have capacity to open an additional number of streams of the second type.

Thus, in a step 760, the client library checks whether the access object service has a sufficient stream count (or available streaming capacity) for the specified stream type corresponding to the feature or operation that the client application seeks to exercise or perform.

In a step 765, if the access object service does not have the capacity to open additional streams of the specified stream type, the client library selects and iterates checking over a next access object service.

In a step 770, if the access object service does have the capacity to open additional streams of the specified stream type, the client library returns the external IP address of the access object service to the client application.

Figure 8:
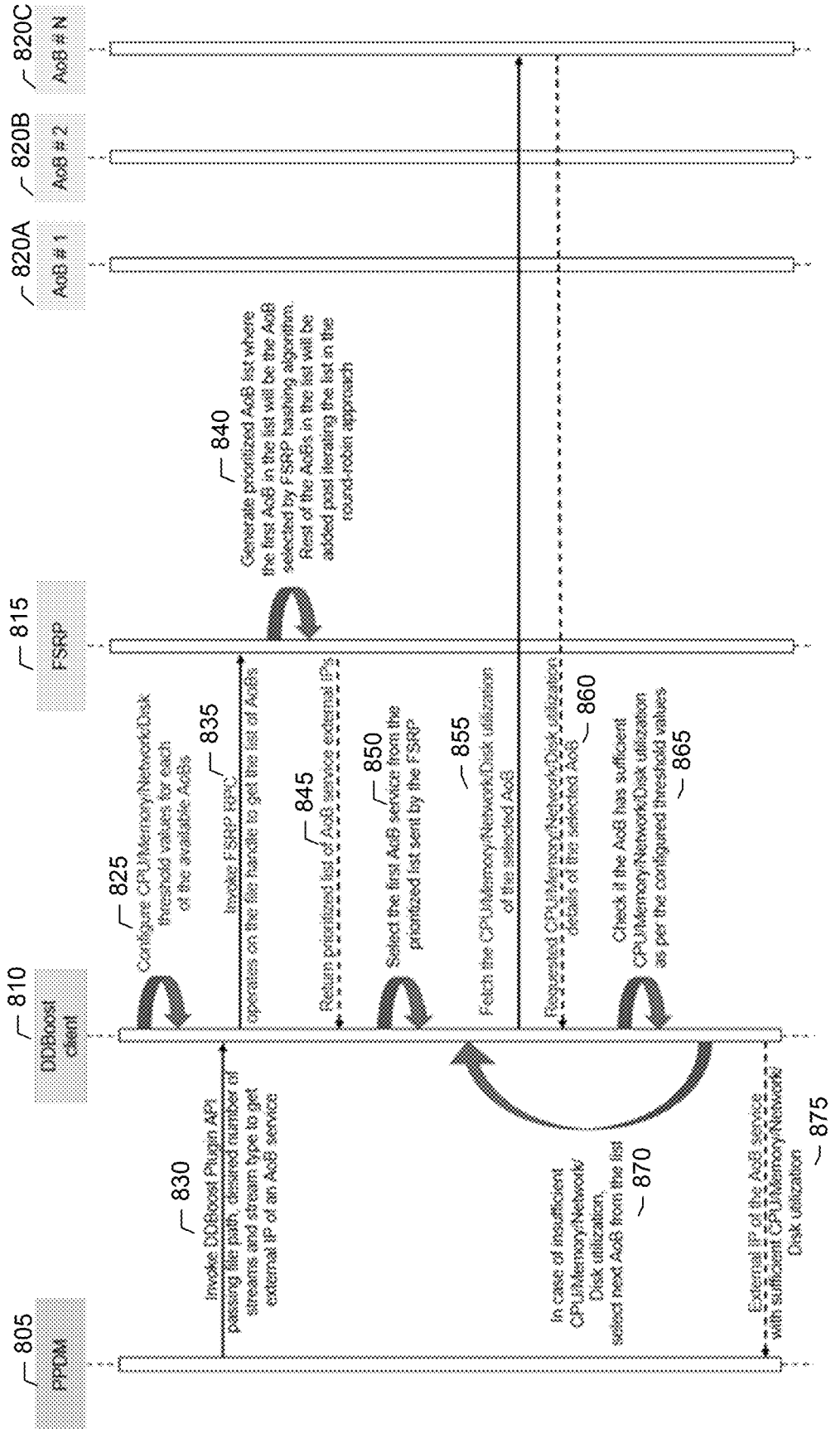
FIG. 8 shows a swimlane diagram for checking resource utilization of a service, according to one or more embodiments.

FIG. 8 shows a swimlane diagram for checking whether an AoB service can support a sufficient amount of CPU/memory/network/disk utilization. In an embodiment, the DDBoost client configures CPU/memory/network/disk utilization threshold values for each of the available AoBs running on the cluster. The DDBoost client then invokes the FSRP RPC to obtain the prioritized list of AoBs where the first AoB in the list is selected by the FSRP hashing algorithm. The DDBoost client then iterates through this prioritized list of AoBs until it is able to find an AoB where the currently observed CPU/memory/network/disk utilization values are less than the configured threshold values for respective parameters in the DDBoost client. The DDBoost returns the external IP of the selected AoB service to the consumer of the DDBoost Plugin API.

The swimlane diagram shown in FIG. 8 is similar to the swimlane diagram shown in FIG. 7. For example, entities shown in FIG. 8 include a client application 805, client-side deduplication library or plugin 810, filesystem redirector proxy service (FSRP) 815, and any number of access object services 820A-N. In a step 825, the client library configures CPU/memory/network/disk threshold values for each of the available access object services in the cluster. These parameters can be used to assess or evaluate the capability of an access object service to handle another operation.

For example, CPU utilization measures the amount of time the CPU spends executing instructions. CPU utilization may be expressed as a percentage, representing the portion of time the CPU is actively working versus idle. Memory utilization refers to the amount of system memory (RAM) being used by applications and processes. Memory utilization may be expressed as a percentage or in absolute terms (e.g., gigabytes). Network utilization measures the amount of network bandwidth being used by incoming and outgoing data traffic. Network utilization may be expressed in bits per second (bps), kilobits per second (kbps), or megabits per second (Mbps). Disk utilization refers to the amount of disk I/O (input/output) operations being performed by storage devices (e.g., hard drives or solid-state drives). Disk utilization can include read and write operations, as well as disk latency (the time it takes to complete I/O operations). Disk utilization may be measured in terms of IOPS (input/output operations per second) or throughput (e.g., megabytes per second).

In an embodiment, the thresholds for each parameter are configured based on resources of a node hosting an access object service. The client library may query each access object service via FSRP to collect details concerning CPU, memory, network, and disk resources available to a node hosting the access object service. The performance of the service is heavily dependent on the amounts of CPU, memory, network, and disk resources available.

For example, the CPU is responsible for handling computational tasks and executing instructions. Higher CPU capacity allows the service to process more tasks simultaneously, leading to improved responsiveness and throughput. Insufficient CPU resources can result in CPU saturation, causing delays in task execution, increased response times, and degraded system performance. Sufficient memory capacity enables the service to store and access data more efficiently, reducing the need for frequent disk I/O operations. Higher memory capacity allows for more applications and processes to run concurrently without impacting performance. Adequate memory prevents excessive swapping (use of virtual memory), which can lead to performance degradation due to increased disk activity. Sufficient network bandwidth facilitates faster data transfer rates between systems and enables efficient communication between networked devices. Higher network bandwidth allows for faster data transmission, reduced latency, and improved responsiveness for network applications. Insufficient network bandwidth can lead to network congestion, packet loss, and increased response times for networked applications. Adequate disk I/O capacity enables the service to read and write data to storage devices efficiently. Higher disk I/O throughput allows for faster access to data, shorter response times, and improved performance for disk-intensive applications. Insufficient disk I/O capacity can lead to disk contention, increased disk latency, and degraded performance for I/O-bound applications.

Thus, for example, an access object service hosted by a node having high CPU capacity may have a higher CPU threshold value as compared to another access object service hosted by a node having a lower amount of CPU capacity. An access object service hosted by a node having high amounts of memory may have a higher memory threshold value as compared to another access object service hosted by a node having a lower amount of memory. An access object service hosted by a node having high amounts of network bandwidth may have a higher network bandwidth threshold value as compared to another access object service hosted by a node having a lower amount of network bandwidth. An access object service hosted by a node having high amounts of disk I/O capacity may have a higher disk I/O threshold value as compared to another access object service hosted by a node having a lower amount of disk I/O capacity.

In a step 830, the client application makes a request to exercise a feature or operation offered by the data protection appliance. In particular, the client application invokes the client library or plugin API and passes with a corresponding request a file path, desired number of streams, and stream type to obtain an external IP address of an access object service to handle the request.

In a step 835, the client library or plugin, in turn, makes a procedure call to FSRP. Specifically, the client invokes an FSRP RPC to operate on the file handle to obtain a list of the access object services. In a step 840, FSRP receives the RPC message and associated parameters, e.g., file handle or path, from the client and begins to generate a prioritized access object list. In an embodiment, a first or initial access object service in the prioritized list is the access object service selected by the FSRP hashing algorithm. This first or initial access object service may be referred to as a preferred access object service. The rest of the access object services in the list are added post iterating the list using a round-robin approach.

In a step 845, FSRP returns the prioritized list of access object services to the client library. Each access object service in the list is identified by an external IP address through which a respective access object service can be reached.

In a step 850, the client library selects the first access object service from the prioritized list sent by FSRP to check whether the access object service satisfies a set of conditions associated with the operation that has been requested by the client application (e.g., PPDM).

Specifically, in a step 855, the client library communicates with the access object service to fetch current metrics or utilization values associated with CPU, memory, network, and disk utilization of the access object service. In a step 860, the access object service responds accordingly with the requested CPU, memory, network, and disk utilization values.

In a step 865, the client library compares the current utilization values associated with CPU, memory, network, and disk against the corresponding threshold values for CPU, memory, network, and disk that have been calculated (step 825).

In a step 870, if the access object service has insufficient capacity based on the comparison between the current utilization values and threshold values for CPU, memory, network, and disk, the client library selects and iterates checking over a next access object service.

In a step 875, if the access object service does have sufficient capacity based on the comparison, the client library returns the external IP address of the access object service to the client application.

Figure 9:
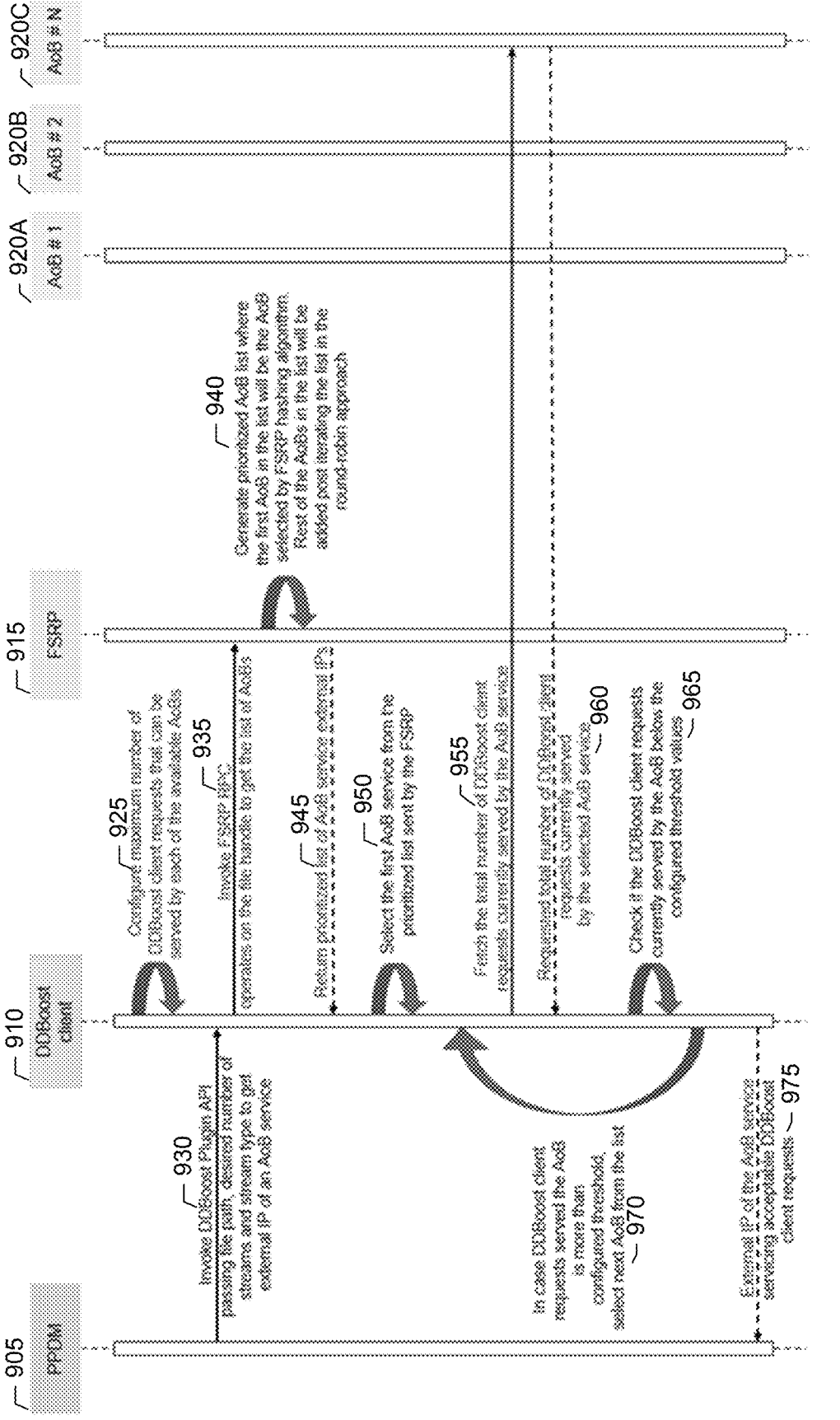
FIG. 9 shows a swimlane diagram for checking a count of client requests of a service, according to one or more embodiments.

FIG. 9 shows a swimlane diagram for checking whether client requests currently being served by an AoB are below configured threshold values. In an embodiment, the DDBoost client configures a maximum number of DDBoost client requests that can be served by each of the available AoB services running on the cluster. The DDBoost client then invokes the FSRP RPC to obtain the prioritized list of AoBs where the first AoB in the list is selected by the FSRP hashing algorithm. The DDBoost client then iterates through this prioritized list of AoBs until it is able to find an AoB service whose total number of DDBoost client requests it is currently serving is less than the configured threshold values for respective parameters in the DDBoost client. The DDBoost returns the external IP address of the selected AoB service to the consumer of the DDBoost Plugin API.

The swimlane diagram shown in FIG. 9 is similar to the swimlane diagram shown in FIG. 7. For example, entities shown in FIG. 9 include a client application 905, client-side deduplication library or plugin 910, filesystem redirector proxy service (FSRP) 915, and any number of access object services 920A-N. In a step 925, the client library configures a maximum or threshold number of client requests that can be served by each of the available access object services in the cluster. In an embodiment, the number of client requests an access object service can handle depends on factors such as CPU, memory, network bandwidth, and disk I/O capacity and other resources available to the access object service. These factors can vary depending on a node at which the access object service is deployed. The client library may query each access object service via FSRP to collect details concerning resources of a node hosting the access object service in order to derive a maximum or threshold number of client requests that the access object service should be able to handle.

In a step 930, the client application makes a request to exercise a feature or operation offered by the data protection appliance. In particular, the client application invokes the client library or plugin API and passes with a corresponding request a file path, desired number of streams, and stream type to obtain an external IP address of an access object service to handle the request.

In a step 935, the client library or plugin, in turn, makes a procedure call to FSRP. Specifically, the client invokes an FSRP RPC to operate on the file handle to obtain a list of the access object services. In a step 940, FSRP receives the RPC message and associated parameters, e.g., file handle or path, from the client and begins to generate a prioritized access object list. In an embodiment, a first or initial access object service in the prioritized list is the access object service selected by the FSRP hashing algorithm. This first or initial access object service may be referred to as a preferred access object service. The rest of the access object services in the list are added post iterating the list using a round-robin approach.

In a step 945, FSRP returns the prioritized list of access object services to the client library. Each access object service in the list is identified by an external IP address through which a respective access object service can be reached.

In a step 950, the client library selects the first access object service from the prioritized list sent by FSRP to check whether the access object service satisfies a set of conditions associated with the operation that has been requested by the client application (e.g., PPDM).

Specifically, in a step 955, the client library communicates with the access object service to fetch a total number of client requests currently being served by the access object service. In a step 960, the access object service responds accordingly with the requested count of client requests that are currently being served.

In a step 965, the client library compares the current total count or number of client requests against the maximum or threshold number of client requests that have been configured for the access object service (step 925).

In a step 970, if the number of client requests currently being served by the access object service is above the maximum or threshold number of client requests configured for the access object service, the client library selects and iterates checking over a next access object service.

In a step 975, if the number of client requests currently being served by the access object service is below the maximum or threshold number of client requests configured for the access object service, the client library returns the external IP address of the access object service to the client application.

In an embodiment, systems and techniques are provided to prioritize a list of alternate server nodes to a client for backup/recovery based on resource usage. Providing these multiple alternate node locations to a client can facilitate greater resiliency in an environment where resource usage can change quickly. The described systems and techniques enable a client to redirect to a server with sufficient resources to process its request, thereby eliminating the overhead of encountering resource limitations and falling back to discovery logic to find a suitable node.

In an embodiment, a method includes: receiving, at a client-side deduplication library installed at a client, a request from an application on the client for an operation offered by a data protection system coupled to the client, the data protection system comprising a deduplication filesystem storing files, the files being represented by tree data structures; issuing a request to the filesystem for a list of access object (AoB) services that are available to handle the request from the application, the AoBs being responsible for operations involving upper levels of the tree data structures; receiving the list of the AoB services, the list comprising an indication of a preferred AoB service for the operation as determined by the deduplication filesystem; checking that the preferred AoB service satisfies a plurality of conditions; when the preferred AoB service satisfies each condition of the plurality of conditions, redirecting the application to the preferred AoB service; and when the preferred AoB service does not satisfy each condition of the plurality of conditions, iterating over other AoB services in the list to find an AoB service that does satisfy each condition of the plurality of conditions.

The plurality of conditions may include a first condition, the first condition being satisfied when the preferred AoB service is capable of supporting a count of streams of a particular type, the particular type of stream being specific to the requested operation. The plurality of conditions may include a first condition, the first condition being satisfied when resource utilization by the preferred AoB service is below a threshold resource utilization. The plurality of conditions may include a first condition, the first condition being satisfied when a number of other client requests being handled by the preferred AoB service is below a threshold number of client requests.

The checking that the preferred AoB service satisfies a plurality of conditions may include: calculating a threshold resource utilization for the preferred AoB service based on resources of a node where the preferred AoB service is deployed, the threshold resource utilization indicating a level at which the AoB service is at maximum capacity; checking a current resource utilization of the preferred AoB service; comparing the current resource utilization against the threshold resource utilization; if the current resource utilization is below the threshold resource utilization, determining that the preferred AoB service satisfies at least one condition of the plurality of conditions; and if the current resource utilization is above the threshold resource utilization, determining that the preferred AoB service does not satisfy the at least one condition.

The checking that the preferred AoB service satisfies a plurality of conditions may include: calculating a threshold number of client requests that can be handled by the preferred AoB service based on resources of a node where the preferred AoB service is deployed; checking a current number of client requests being handled by the preferred AoB service; comparing the current number of client requests against the threshold number of client requests; if the current number of client requests is below the threshold number of client requests, determining that the preferred AoB service satisfies at least one condition of the plurality of conditions; and if the current number of client requests is above the threshold number of client requests, determining that the preferred AoB service does not satisfy the at least one condition.

In another embodiment, there is a system comprising: a processor; and memory configured to store one or more sequences of instructions which, when executed by the processor, cause the processor to carry out the steps of: receiving, at a client-side deduplication library installed at a client, a request from an application on the client for an operation offered by a data protection system coupled to the client, the data protection system comprising a deduplication filesystem storing files, the files being represented by tree data structures; issuing a request to the filesystem for a list of access object (AoB) services that are available to handle the request from the application, the AoBs being responsible for operations involving upper levels of the tree data structures; receiving the list of the AoB services, the list comprising an indication of a preferred AoB service for the operation as determined by the deduplication filesystem; checking that the preferred AoB service satisfies a plurality of conditions; when the preferred AoB service satisfies each condition of the plurality of conditions, redirecting the application to the preferred AoB service; and when the preferred AoB service does not satisfy each condition of the plurality of conditions, iterating over other AoB services in the list to find an AoB service that does satisfy each condition of the plurality of conditions.

In another embodiment, there is a computer program product, comprising a non-transitory computer-readable medium having a computer-readable program code embodied therein, the computer-readable program code adapted to be executed by one or more processors to implement a method comprising: receiving, at a client-side deduplication library installed at a client, a request from an application on the client for an operation offered by a data protection system coupled to the client, the data protection system comprising a deduplication filesystem storing files, the files being represented by tree data structures; issuing a request to the filesystem for a list of access object (AoB) services that are available to handle the request from the application, the AoBs being responsible for operations involving upper levels of the tree data structures; receiving the list of the AoB services, the list comprising an indication of a preferred AoB service for the operation as determined by the deduplication filesystem; checking that the preferred AoB service satisfies a plurality of conditions; when the preferred AoB service satisfies each condition of the plurality of conditions, redirecting the application to the preferred AoB service; and when the preferred AoB service does not satisfy each condition of the plurality of conditions, iterating over other AoB services in the list to find an AoB service that does satisfy each condition of the plurality of conditions.

Referring back now to FIG. 1, the clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, storage may represent logical storage that includes any number of physical storage devices connected to form a logical storage.

In an embodiment, the clients may be referred to as backup clients. In this embodiment, the filesystem provides a backup target for data generated by the clients. The backups are secondary copies that can be used in the event that primary file copies on the clients become unavailable due to, for example, data corruption, accidental deletion, natural disaster, data breaches, hacks, or other data loss event. The backups may be stored in a format such as a compressed format, deduplicated format, or encrypted format that is different from the native source format. In an embodiment, the filesystem is hosted by a cluster of nodes (e.g., two or more nodes). Depending on demand, cluster nodes or services may be dynamically scaled up or down. Thus, the cluster may be referred to as a scale out cluster. For example, as part of on-going operations, new nodes or new instances of a service may be added to the cluster or existing nodes or instances of a service may be removed from the cluster.

Figure 10:
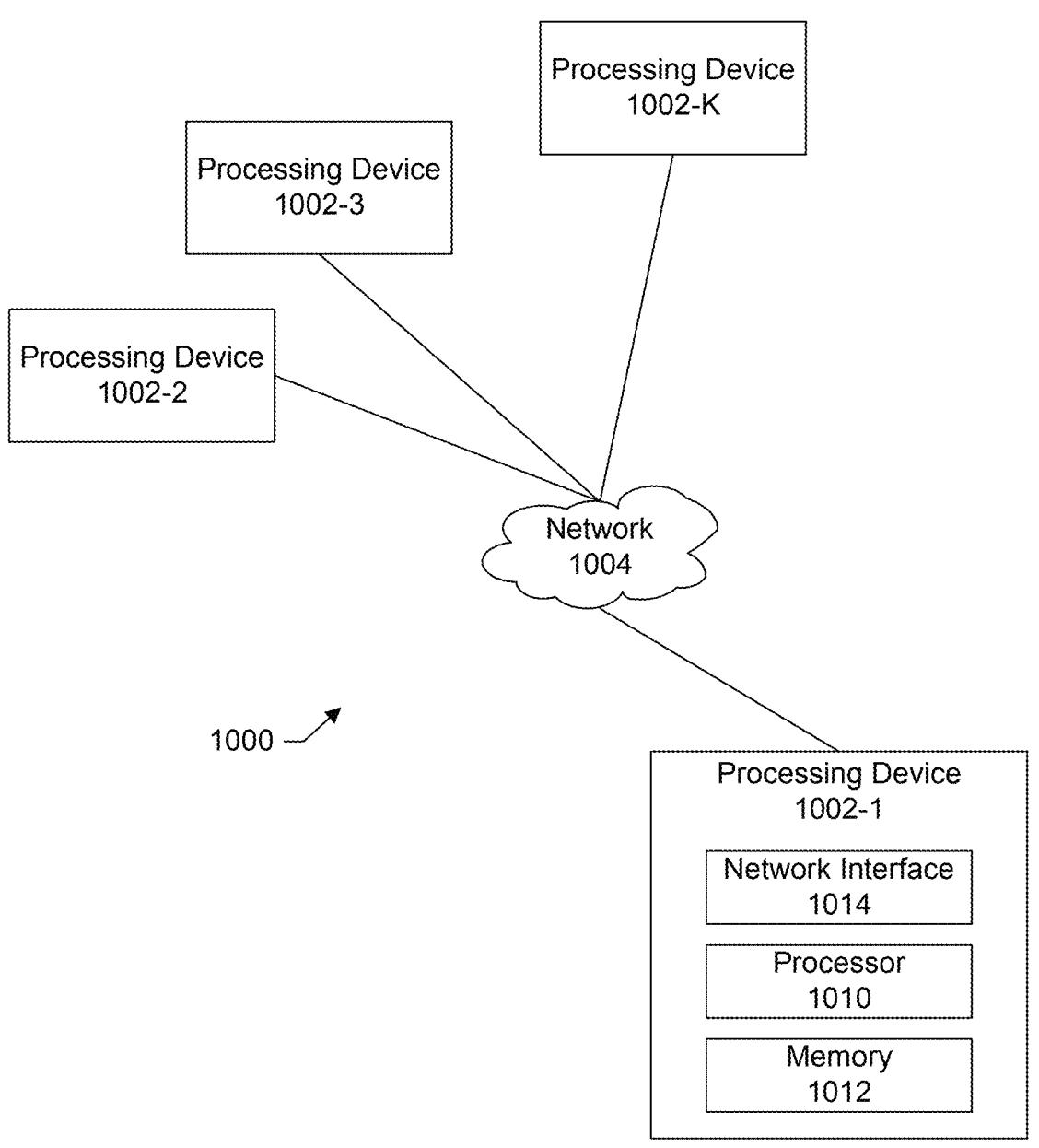
FIG. 10 shows a block diagram of a processing platform that may be utilized to implement at least a portion of an information processing system, according to one or more embodiments.

FIG. 10 shows an example of a processing platform 1000 that may include at least a portion of the information handling system shown in FIG. 1. The example shown in FIG. 10 includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 11:
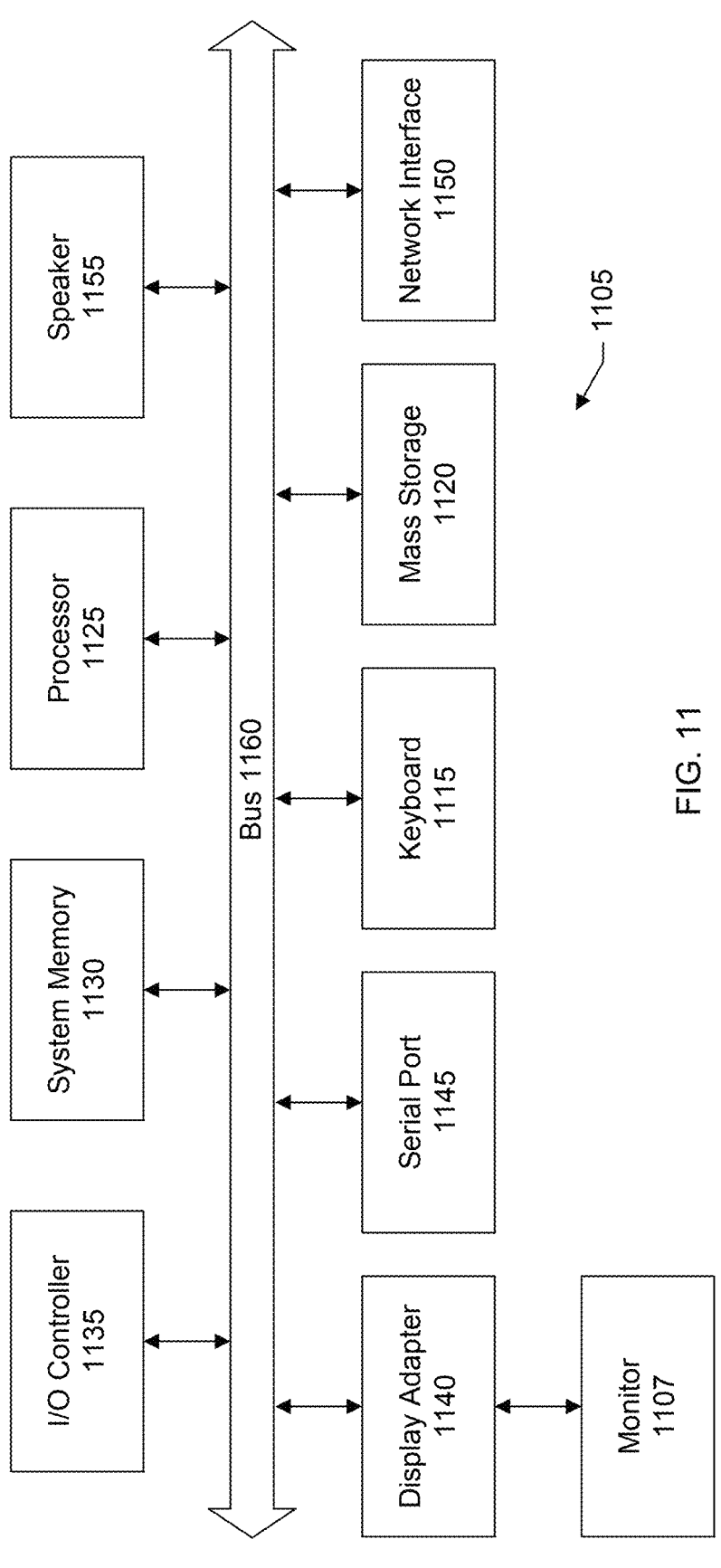
FIG. 11 shows a block diagram of a computer system suitable for use with the system, according to one or more embodiments.

FIG. 11 shows a system block diagram of a computer system 1105 used to execute the software of the present system described herein. The computer system includes a monitor 1107, keyboard 1115, and mass storage devices 1120. Computer system 1105 further includes subsystems such as central processor 1125, system memory 1130, input/output (I/O) controller 1135, display adapter 1140, serial or universal serial bus (USB) port 1145, network interface 1150, and speaker 1155. The system may also be used with computer systems with additional or fewer subsystems. For example, a computer system could include more than one processor 1125 (i.e., a multiprocessor system) or a system may include a cache memory.

Arrows such as 1160 represent the system bus architecture of computer system 1105. However, these arrows are illustrative of any interconnection scheme serving to link the subsystems. For example, speaker 1155 could be connected to the other subsystems through a port or have an internal direct connection to central processor 1125. The processor may include multiple processors or a multicore processor, which may permit parallel processing of information. Computer system 1105 shown in FIG. 11 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for returning a prioritized list of access object (AoB) services to a client comprising:

receiving, at a client-side deduplication library installed and executing at the client, a request from an application on the client for an operation offered by a data protection system coupled to the client, via a network, the data protection system comprising a deduplication filesystem storing files, the files being represented by tree data structures;

issuing, by the client-side deduplication library, a request to a redirection service of the filesystem for the prioritized list of the AoB services that are available to handle the request from the application, the AoBs being responsible for operations involving upper levels of the tree data structures;

receiving, at the client-side deduplication library from the redirection service, the prioritized list of the AoB services, the prioritized list comprising an indication of a preferred AoB service for the operation as determined by the redirection service of the deduplication filesystem, and the prioritized list further comprising other alternate AoB services that are also available, each AoB service in the prioritized list being identified by an Internet Protocol (IP) address;

checking, by the client-side deduplication library, that the preferred AoB service satisfies a plurality of conditions;

when, the client-side deduplication library has determined that the preferred AoB service satisfies each condition of the plurality of conditions, redirecting, by the client-side deduplication library, the application to the preferred AoB service, the redirecting comprising returning, by the client-side deduplication library, the IP address of the preferred AoB service to the application; and when, the client-side deduplication library has determined that the preferred AoB service does not satisfy each condition of the plurality of conditions, iterating, by the client-side deduplication library, over the other alternate AoB services in the prioritized list to find an alternate AoB service that does satisfy each condition of the plurality of conditions, and upon finding another alternate AoB service in the prioritized list that does satisfy each condition of the plurality of conditions, returning, by the client-side deduplication library, the IP address of the alternate AoB service to the application, wherein the application uses the returned IP address to make a direct connection to one of the preferred AoB service or the alternate AoB service.

2. The method of claim 1 wherein the plurality of conditions comprise a first condition, the first condition being satisfied when the preferred AoB service is capable of supporting a count of streams of a particular type, the particular type of stream being specific to the requested operation.

3. The method of claim 1 wherein the plurality of conditions comprise a first condition, the first condition being satisfied when resource utilization by the preferred AoB service is below a threshold resource utilization.

4. The method of claim 1 wherein the plurality of conditions comprise a first condition, the first condition being satisfied when a number of other client requests being handled by the preferred AoB service is below a threshold number of client requests.

5. The method of claim 1 wherein the checking that the preferred AoB service satisfies a plurality of conditions comprises:

calculating a threshold resource utilization for the preferred AoB service based on resources of a node where the preferred AoB service is deployed;

checking a current resource utilization of the preferred AoB service;

comparing the current resource utilization against the threshold resource utilization;

if the current resource utilization is below the threshold resource utilization, determining that the preferred AoB service satisfies at least one condition of the plurality of conditions; and if the current resource utilization is above the threshold resource utilization, determining that the preferred AoB service does not satisfy the at least one condition.

6. The method of claim 1 wherein the checking that the preferred AoB service satisfies a plurality of conditions comprises:

calculating a threshold number of client requests that can be handled by the preferred AoB service based on resources of a node where the preferred AoB service is deployed;

checking a current number of client requests being handled by the preferred AoB service;

comparing the current number of client requests against the threshold number of client requests;

if the current number of client requests is below the threshold number of client requests, determining that the preferred AoB service satisfies at least one condition of the plurality of conditions; and if the current number of client requests is above the threshold number of client requests, determining that the preferred AoB service does not satisfy the at least one condition.

7. A system for returning a prioritized list of access object (AoB) services to a client comprising:

a processor; and memory storing instructions that, when executed by the processor, cause the processor to perform acts comprising:

receiving, at a client-side deduplication library installed and executing at the client, a request from an application on the client for an operation offered by a data protection system coupled to the client, via a network, the data protection system comprising a deduplication filesystem storing files, the files being represented by tree data structures;

issuing, by the client-side deduplication library, a request to a redirection service of the filesystem for the prioritized list of the AoB services that are available to handle the request from the application, the AoBs being responsible for operations involving upper levels of the tree data structures;

receiving, at the client-side deduplication library from the redirection service, the prioritized list of the AoB services, the prioritized list comprising an indication of a preferred AoB service for the operation as determined by the redirection service of the deduplication filesystem, and the prioritized list further comprising other alternate AoB services that are also available, each AoB service in the prioritized list being identified by an Internet Protocol (IP) address;

checking, by the client-side deduplication library, that the preferred AoB service satisfies a plurality of conditions;

when, the client-side deduplication library has determined that the preferred AoB service satisfies each condition of the plurality of conditions, redirecting, by the client-side deduplication library, the application to the preferred AoB service, the redirecting comprising returning, by the client-side deduplication library, the IP address of the preferred AoB service to the application; and when, the client-side deduplication library has determined that the preferred AoB service does not satisfy each condition of the plurality of conditions, iterating, by the client-side deduplication library, over the other alternate AoB services in the prioritized list to find an alternate AoB service that does satisfy each condition of the plurality of conditions, and upon finding another alternate AoB service in the prioritized list that does satisfy each condition of the plurality of conditions, returning, by the client-side deduplication library, the IP address of the alternate AoB service to the application, wherein the application uses the returned IP address to make a direct connection to one of the preferred AoB service or the alternate AoB service.

8. The system of claim 7 wherein the plurality of conditions comprise a first condition, the first condition being satisfied when the preferred AoB service is capable of supporting a count of streams of a particular type, the particular type of stream being specific to the requested operation.

9. The system of claim 7 wherein the plurality of conditions comprise a first condition, the first condition being satisfied when resource utilization by the preferred AoB service is below a threshold resource utilization.

10. The system of claim 7 wherein the plurality of conditions comprise a first condition, the first condition being satisfied when a number of other client requests being handled by the preferred AoB service is below a threshold number of client requests.

11. The system of claim 7 wherein the checking that the preferred AoB service satisfies a plurality of conditions comprises:

calculating a threshold resource utilization for the preferred AoB service based on resources of a node where the preferred AoB service is deployed;

checking a current resource utilization of the preferred AoB service;

comparing the current resource utilization against the threshold resource utilization;

if the current resource utilization is below the threshold resource utilization, determining that the preferred AoB service satisfies at least one condition of the plurality of conditions; and if the current resource utilization is above the threshold resource utilization, determining that the preferred AoB service does not satisfy the at least one condition.

12. The system of claim 7 wherein the checking that the preferred AoB service satisfies a plurality of conditions comprises:

calculating a threshold number of client requests that can be handled by the preferred AoB service based on resources of a node where the preferred AoB service is deployed;

checking a current number of client requests being handled by the preferred AoB service;

comparing the current number of client requests against the threshold number of client requests;

if the current number of client requests is below the threshold number of client requests, determining that the preferred AoB service satisfies at least one condition of the plurality of conditions; and if the current number of client requests is above the threshold number of client requests, determining that the preferred AoB service does not satisfy the at least one condition.

13. A computer program product, comprising a non-transitory computer-readable medium having a computer-readable program code embodied therein, the computer-readable program code adapted to be executed by one or more processors to implement a method for returning a prioritized list of access object (AoB) services to a client comprising:

receiving, at a client-side deduplication library installed and executing at the client, a request from an application on the client for an operation offered by a data protection system coupled to the client, via a network, the data protection system comprising a deduplication filesystem storing files, the files being represented by tree data structures;

issuing, by the client-side deduplication library, a request to a redirection service of the filesystem for the prioritized list of the AoB services that are available to handle the request from the application, the AoBs being responsible for operations involving upper levels of the tree data structures;

receiving, at the client-side deduplication library from the redirection service, the prioritized list of the AoB services, the prioritized list comprising an indication of a preferred AoB service for the operation as determined by the redirection service of the deduplication filesystem, and the prioritized list further comprising other alternate AoB services that are also available, each AoB service in the prioritized list being identified by an Internet Protocol (IP) address;

checking, by the client-side deduplication library, that the preferred AoB service satisfies a plurality of conditions;

when, the client-side deduplication library has determined that the preferred AoB service satisfies each condition of the plurality of conditions, redirecting, by the client-side deduplication library, the application to the preferred AoB service, the redirecting comprising returning, by the client-side deduplication library, the IP address of the preferred AoB service to the application; and when, the client-side deduplication library has determined that the preferred AoB service does not satisfy each condition of the plurality of conditions, iterating, by the client-side deduplication library, over the other alternate AoB services in the prioritized list to find an alternate AoB service that does satisfy each condition of the plurality of conditions, and upon finding another alternate AoB service in the prioritized list that does satisfy each condition of the plurality of conditions, returning, by the client-side deduplication library, the IP address of the alternate AoB service to the application, wherein the application uses the returned IP address to make a direction connection to one of the preferred AoB service or the alternate AoB service.

14. The computer program product of claim 13 wherein the plurality of conditions comprise a first condition, the first condition being satisfied when the preferred AoB service is capable of supporting a count of streams of a particular type, the particular type of stream being specific to the requested operation.

15. The computer program product of claim 13 wherein the plurality of conditions comprise a first condition, the first condition being satisfied when resource utilization by the preferred AoB service is below a threshold resource utilization.

16. The computer program product of claim 13 wherein the plurality of conditions comprise a first condition, the first condition being satisfied when a number of other client requests being handled by the preferred AoB service is below a threshold number of client requests.

17. The computer program product of claim 13 wherein the checking that the preferred AoB service satisfies a plurality of conditions comprises:

calculating a threshold resource utilization for the preferred AoB service based on resources of a node where the preferred AoB service is deployed;

checking a current resource utilization of the preferred AoB service;

comparing the current resource utilization against the threshold resource utilization;

if the current resource utilization is below the threshold resource utilization, determining that the preferred AoB service satisfies at least one condition of the plurality of conditions; and if the current resource utilization is above the threshold resource utilization, determining that the preferred AoB service does not satisfy the at least one condition.

18. The computer program product of claim 13 wherein the checking that the preferred AoB service satisfies a plurality of conditions comprises:

calculating a threshold number of client requests that can be handled by the preferred AoB service based on resources of a node where the preferred AoB service is deployed;

checking a current number of client requests being handled by the preferred AoB service;

comparing the current number of client requests against the threshold number of client requests;

if the current number of client requests is below the threshold number of client requests, determining that the preferred AoB service satisfies at least one condition of the plurality of conditions; and if the current number of client requests is above the threshold number of client requests, determining that the preferred AoB service does not satisfy the at least one condition.

* * * * *